US008886411B2

(12) United States Patent
Hisazumi et al.

(10) Patent No.: US 8,886,411 B2
(45) Date of Patent: Nov. 11, 2014

(54) POWER STEERING SYSTEM (71) Applicant: Hitachi Automotive Systems Steering, Ltd., Saitama (JP)

(72) Inventors: Takumi Hisazumi, Atsugi (JP); Atsushi Yoshitake, Ebina (JP)

(73) Assignee: Hitachi Automotive Systems Steering, Ltd., Saitama (JP)

( * ) Notice: Subject to any disclaimer, the term of this patent is extended or adjusted under 35 U.S.C. 154(b) by 0 days.

(21) Appl. No.: 13/860,544

(22) Filed: Apr. 11, 2013

(65) Prior Publication Data
US 2014/0074357 A1 Mar. 13, 2014

(30) Foreign Application Priority Data

Sep. 13, 2012 (JP) ................. 2012-201120

(51) Int. Cl.
*B62D 5/04* (2006.01)
(52) U.S. Cl.
CPC ............ *B62D 5/0481* (2013.01); *B62D 5/0487* (2013.01)
USPC ........................................... 701/42; 180/443
(58) Field of Classification Search
USPC ............................................ 701/43; 180/443
See application file for complete search history.

(56) References Cited

U.S. PATENT DOCUMENTS

2011/0098887 A1* 4/2011 Fujimoto ........................ 701/41

FOREIGN PATENT DOCUMENTS

JP 2009-261067 A 11/2009

* cited by examiner

*Primary Examiner* — Mary Cheung
*Assistant Examiner* — Yuen Wong
(74) *Attorney, Agent, or Firm* — Crowell & Moring LLP

(57) ABSTRACT

In a power steering system, at least one of phase open relays in which a contact weld (an abnormality) occurs is detected. That is to say, the power steering system comprises an abnormality monitor section (57) configured to output vector control command signals to supply only a d-axis current in a positive side direction toward the motor, with all of phase open relays (58v, 58w) in an interruption state, and to determine an abnormality in at least one of the phase open relays in a case where a current value is detected by a current detection circuit which detects a current flowing into an inverter. In a case of three phase open relays installed between respective three phases of motor windings, a potential difference is detected at a neutral position of a star connection to determine the abnormality of at least two of the phase open relays.

19 Claims, 7 Drawing Sheets

PHASE VOLTAGE U > W > V

PHASE VOLTAGE U > W

PHASE VOLTAGE U > W

PHASE VOLTAGE V > W > U

CURRENT IS GENERATED FROM W PHASE TO U PHASE

PHASE VOLTAGE W > U

PHASE VOLTAGE W = U < V

FIG.7

POWER STEERING SYSTEM

BACKGROUND OF THE INVENTION (1) Field of the Invention

The present invention relates to a power steering system and particularly relates to a technique of an abnormality determination of phase open relays attached onto an electrically driven motor providing a steering assistance force for a steering mechanism.

(2) Description of Related Art

In an electrically driven motor installed in a power steering system, phase open relays which are arranged to disable a power supply to the motor are ordinarily disposed in order to prevent a motor burnout due to a failure of a motor drive circuit and to prevent an abrupt stop of the motor due to an electromagnetic brake. Each phase open relay has normally open contacts in a closure state (ON) when the power steering system is in a normal working state. However, when the failure described above is detected, the contacts of each of phase open relays are made open (OFF) so that the power supply to the motor is disabled.

A Japanese Patent Application First Publication (tokkai) No. 2009-261067 published on Nov. 5, 2009 exemplifies a previously proposed abnormality detection technique of phase open means disposed in the power steering system.

SUMMARY OF THE INVENTION

However, in order to detect contact welds of one or more of the phase open relays, a diagnosis using a circuit exclusively for a contact welding detection purpose is needed to be carried out. In addition, if the circuit exclusive for the contact welding detection purpose is not used, it is necessary to carry out the diagnoses a plurality of number of times corresponding to the number of phase open relays disposed in respective phases of the motor or the number of relay contacts. The diagnostic program, hence, becomes complicated.

It is, therefore, an object of the present invention to provide a power steering system which is capable of detecting a contact weld of any one or more of the phase open relays with a simple diagnostic program without use of the circuit exclusive for the contact weld detection purpose.

According to one aspect of the present invention, there is provided a power steering system, comprising: a steering mechanism that steers steerable wheels of a vehicle along with a steering operation of a steering wheel; a motor that provides a steering assistance force for the steering mechanism; a control apparatus that drivingly controls the motor; a command signal calculation section disposed in the control apparatus to calculate vector control command signals to drivingly control the motor in accordance with a driving situation of the vehicle; a two-phase to three-phase conversion section disposed in the control apparatus to convert the vector control command signals into three phase command signals which are command signals for respective phases of the motor; a PWM control section disposed in the control apparatus to output a PWM duty signal for each phase of U phase, V phase, and W phase in accordance with the three phase command signals; an inverter disposed in the control apparatus and constituted by a switching circuit drivingly controlled by the PWM duty signal for each phase of the motor; a current detection circuit configured to detect three phase currents flowing into the inverter; a plurality of phase open relays switchable at least any two of the three phases of the motor between a conduction state in which a power supply is enabled to be supplied to the two phases of the motor and an interruption state in which the power supply is disabled to be supplied to the two phases; and an abnormality monitor section configured to output the vector control command signals to supply only a d-axis current in a positive side direction toward the motor, with all of the phase open relays in the interruption state, and to determine an abnormality in at least one of the phase open relays in a case where a current value is detected by the current detection circuit.

According to another aspect of the present invention, there is provided a power steering system, comprising: a steering mechanism that steers steerable wheels of a vehicle along with a steering operation of a steering wheel; a motor that provides a steering assistance force for the steering mechanism; a control apparatus that drivingly controls the motor; a command signal calculation section disposed in the control apparatus to calculate vector control command signals to drivingly control the motor in accordance with a driving situation of the vehicle; a two-phase to three-phase conversion section disposed in the control apparatus to convert the vector control command signals into three phase command signals which are command signals for respective phases of the motor; a PWM control section disposed in the control apparatus to output a PWM duty signal for each phase of U phase, V phase, and W phase in accordance with the three phase command signals; an inverter disposed in the control apparatus and constituted by a switching circuit drivingly controlled by the PWM duty signal for each phase of the motor; a current detection circuit configured to detect three phase currents flowing into the inverter; a plurality of phase open relays switchable at least any two of the three phases of the motor between a conduction state in which a power supply is enabled to be supplied to the two phases of the motor and an interruption state in which the power supply is disabled to be supplied to the two phases; an abnormality monitor section configured to output the vector control command signals to supply only a d-axis current in a negative side direction toward the motor, with all of the phase open relays in the interruption state, and to determine an abnormality in at least one of the phase open relays in a case where a rotation of the motor is detected.

According to a still another aspect of the present invention, there is provided a power steering system, comprising: a steering mechanism that steers steerable wheels of a vehicle along with a steering operation of a steering wheel; a motor including motor windings connected in a star connection and that provides a steering assistance force for the steering mechanism; a control apparatus that drivingly controls the motor; a command signal calculation section disposed in the control apparatus to calculate vector control command signals to drivingly control the motor in accordance with a driving situation of the vehicle; a two-phase to three-phase conversion section disposed in the control apparatus to convert the vector control command signals into three phase command signals which are command signals for respective phases of the motor; a PWM control section disposed in the control apparatus to output a PWM duty signal for each phase of U phase, V phase, and W phase in accordance with the three phase command signals; an inverter disposed in the control apparatus and constituted by a switching circuit drivingly controlled by the PWM duty signal for each phase of the motor; a voltage detection circuit that detects a voltage at a neutral point of the star connection of the motor; a plurality of phase open relays switchable all of the three phases of the motor between a conduction state in which a power supply is enabled to be supplied to a corresponding one phase of the three phases of the motor and an interruption state in which the power supply is disabled to be supplied to the corresponding one phase; and an abnormality monitor section configured to output the vector control command signals to supply only a d-axis current in a negative side direction toward the motor, with all of the phase open relays in the interruption state, and to determine an abnormality in at least two of the phase open relays in a case where the voltage detection circuit detects a potential difference.

DETAILED DESCRIPTION OF THE INVENTION

Hereinafter, each of first and second preferred embodiment of the power steering system according to the present invention will be described on a basis of the attached drawings in order to facilitate a better understanding of the present invention.

Figure 1:
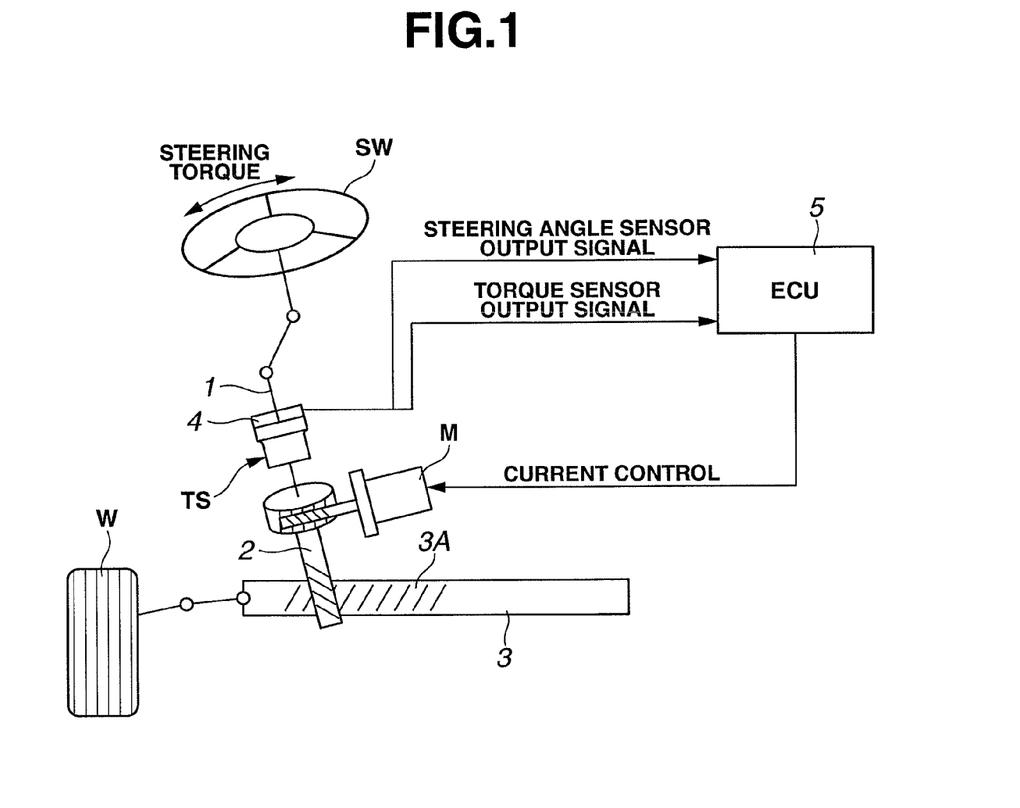
FIG. 1 is a rough configuration view of a power steering system in a first preferred embodiment according to the present invention.
Figure 2:
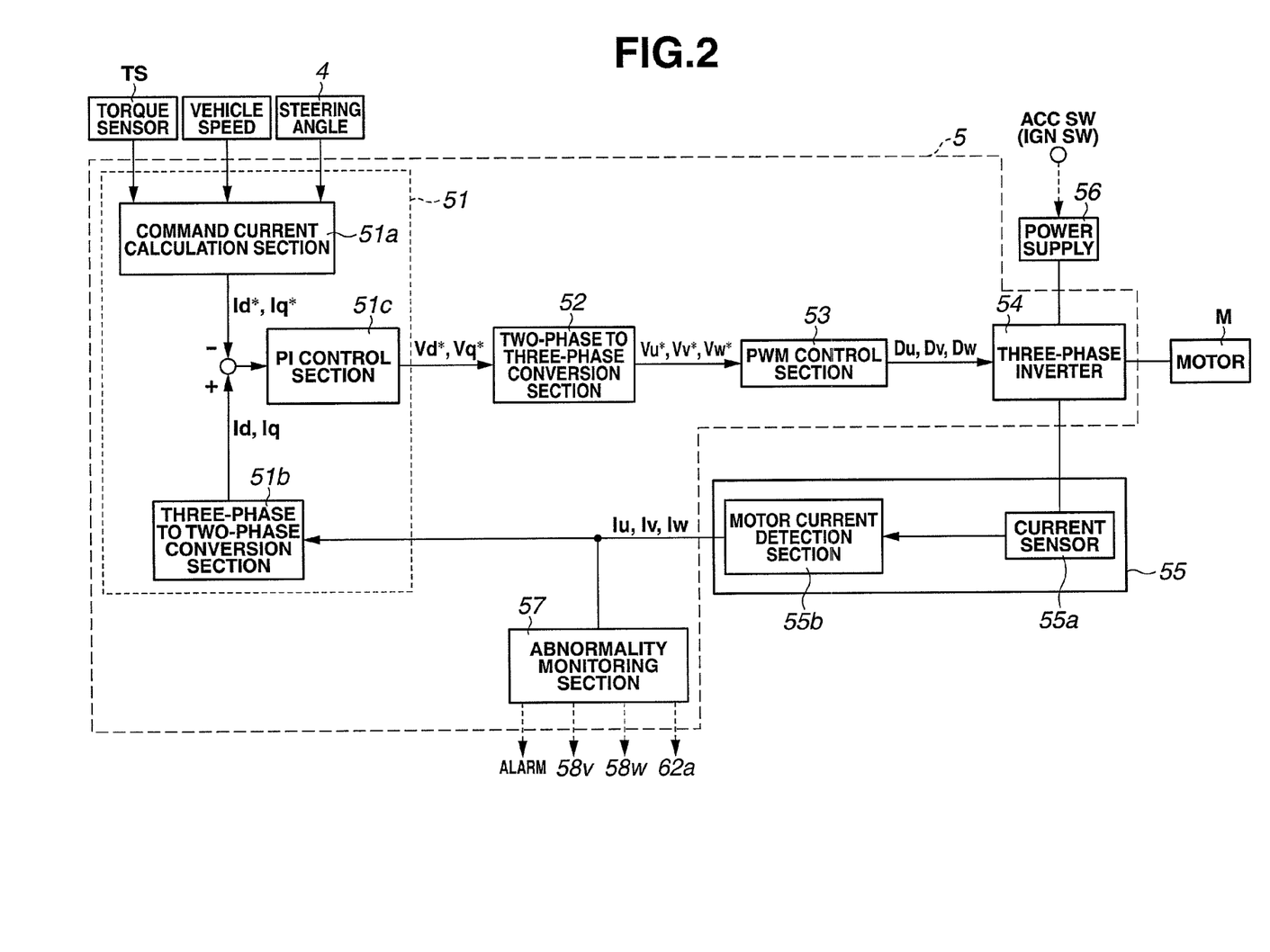
FIG. 2 is a block diagram representing the ECU in the first embodiment shown in FIG. 1.

[First Embodiment]
FIG. 1 shows a rough view of a power steering system in a first preferred embodiment according to the present invention.
The power steering system shown in FIG. 1 includes: a basic steering mechanism including a steering shaft 1; pinion axle 2; and a rack axle 3. When this steering mechanism has a steering wheel SW rotationally operated by a vehicle driver, a steering torque of steering wheel SW is transmitted to pinion axle 2 via steering shaft 1 and a rotational motion of steering wheel SW is converted into a linear motion of rack axle 3 and left and right steerable wheels W linked to both ends of rack axle 3 via tie rods are steered. A teeth section 3A which is meshed with pinion axle 2 is formed on rack 3. A conversion mechanism that converts a rotation of steering shaft 1 into a steering operation is constituted by the meshing of rack teeth section 3A with pinion axle 2. It should be noted that, in FIG. 1, only left steerable wheel W is shown but it is natural that right steerable wheel W is connected to the end of rack axle 3 via the tie rod in the same way as the left steerable wheel.
Torque sensor TS and steering angle sensor 4 are disposed on steering shaft 1 to detect a rotational angle of steering shaft 1 and a current control for an electrically driven motor M (for example, a three-phase brushless motor) is carried out.
To provide a steering assistance force for pinion axle 2.
FIG. 2 shows a block diagram of ECU (Electronic Control Unit) 5. As shown in FIG. 2, ECU 5 includes: a command signal calculation section 51, two-phase to three-phase conversion section 52, a PWM (Pulse Width Modulation) control section 53, and a three-phase inverter 54, and an abnormality monitor section 57.
Command signal calculation section 51 includes: a command current calculation section 51a; a three-phase to two-phase conversion section 51b; and a PI (Proportional-Integration) control section 51c. Command current calculation section 51a calculates command currents Id*, Iq* to drivingly control three-phase brushless motor M in accordance with a driving situation of the vehicle (output signals of a torque sensor TS, a vehicle speed sensor, a steering angle sensor 4, and so forth). Three-phase to two-phase conversion section 51b converts three-phase current detection values Iu, Iv, Iw outputted from a current detection circuit 55 into two phase current detection values Id, Iq. PI control section 51c inputs a deviation between command currents Id*, Iq* and current detection values Id, Iq. PI control command signals Vd*, Vq* and calculates vector control command signals Vd*, Vq* to control three-phase brushless motor M by a proportional-and-integration calculation.
Two-phase to three-phase conversion section 52 converts two-phase vector control command signals Vd*, Vq* into command signals Vu*, Vv*, Vw* of respective phases U, V, W of three-phase brushless motor M.
PWM control section 53 outputs command signals Vu*, Vv*, Vw* of respective phases U, V, W of three-phase brushless motor M in accordance with three-phase command signals Vu*, Vv*, Vw*.
Three-phase inverter 54 is constituted by a switching circuit in which (semiconductor) switching elements in a bridge connection are installed (for example, constituted by six FETs (Field Effect Transistors)). On a basis of PWM duty signals Du, Dv, Dw, the switching elements of inverter 54 are switching operated so that a direct current voltage of power supply 56 is converted into three-phase alternating current (AC) voltages Vu, Vv, Vw which are supplied to three-phase brushless motor M. Thus, three-phase brushless motor M is rotationally driven and a torque generated by three-phase brushless motor M is provided for pinion axle 2 of the steering mechanism as the steering assistance force.
Current detection circuit 55 includes a current sensor 55a and a motor current detection section 55b. In a case where, for example, a shunt resistor constitutes current sensor 55a, a terminal voltage across the shut resistor disposed at an input side of three-phase inverter 54 is detected and three phase current detection values Iu, Iv, Iw flowing through motor M are derived from the above-described terminal voltage. The derived three-phase current detection values Iu, Iv, Iw are outputted to abnormality monitor section 57 and three-phase to two-phase converter 51b.
In three-phase brushless motor M, as shown in FIGS. 3(A) through 3(F), phase open relays 58v, 58w are disposed in at least two phases of the three phases of motor M. Each phase open relay serves to switch a power supply (current flowing) state and a turned-off state (current flow inhibit (disabled) state). Phase open relay 58v, 58w are normally made in closure states to enable the power supply state (for phases V, W) but, during an emergency (abnormality) state (for example, a current command abnormality, an electromagnetic brake, and so forth), are made open to be in an interrupted (turned-off) state so that the power supply to motor windings 59u, 59v, 59w is prevented to stop three-phase brushless motor M. The phase open relays used in this embodiment are electromagnetic coil relays which are normally open but if the electric power is supplied to an electromagnetic coil section of each of the phase open relays, a corresponding relay contact section is closed.

It should, herein, be noted that an abnormality determination method of the phase open relays in a first comparative example will be described below.

Figure 4A:
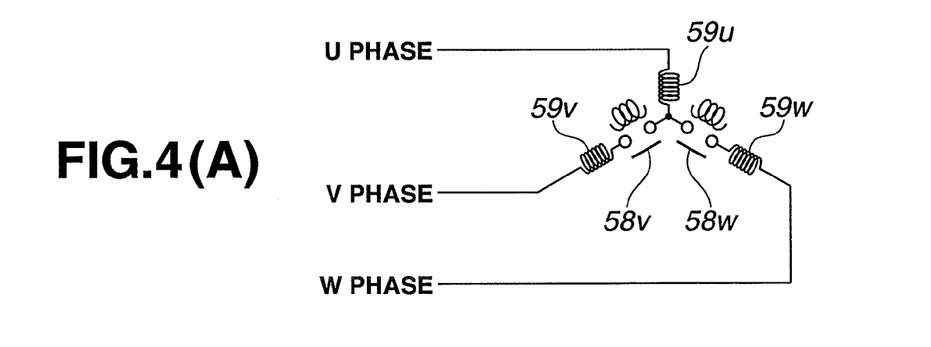
FIGS. 4(A), 4(B), and 4(C) are rough views representing the power steering system for explaining an operation of a diagnosis in a first comparative example in a case where phase open relays are disposed in two phases of the motor.
Figure 4B:
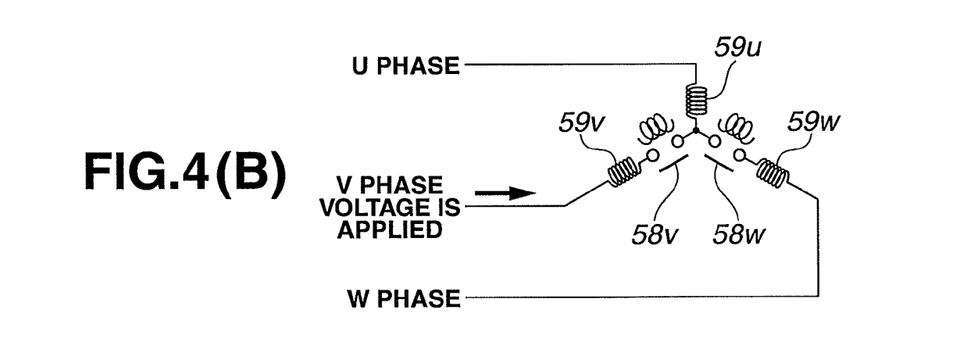

FIG. 4(A) shows a rough view representing motor M in which phase open relays 58v, 58w are disposed on two phases of V phase and W phase from among U phase, V phase, and W phase. In such a case described below, as shown in FIG. 4(B), in a first (time) diagnosis, a voltage from V phase is applied to detect a potential difference between V phase and U phase. Then, if the potential difference is present between V phase and U phase, corresponding phase open relay 58v is determined to be normally turned off. If no potential difference is present between V phase and U phase, corresponding phase open relay 58v is determined to be contact welded.

Figure 4C:
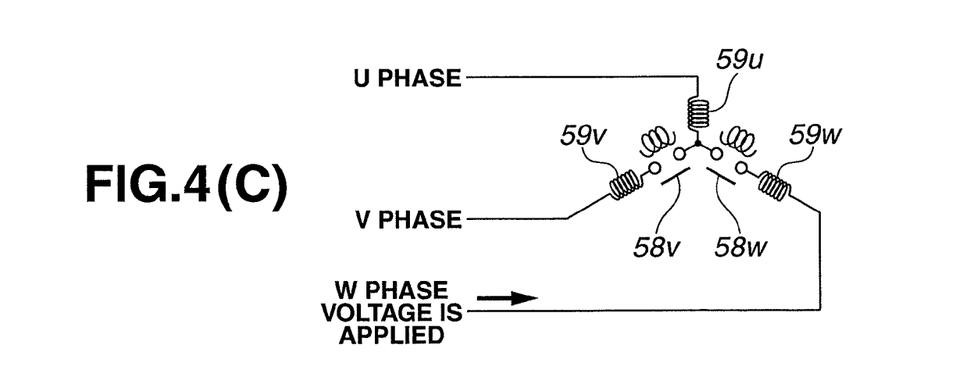

In a second diagnosis, as shown in FIG. 4(C), a voltage is applied from W phase and the potential difference between W phase and U phase is detected. If the electrical potential difference between W phase and U phase is present, phase open relay 58w is determined to be normally cut off and if no potential difference between W phase and U phase, phase open relay 58w is contact welded.

FIGS. 5(A) through 5(D) are rough views representing three-phase brushless motor M in which phase open relays 58u, 58v, 58w are disposed in all of phases U phase, V phase, and W phase. In a case where phase open relays 58u, 58v, 58w are disposed in all of three phases, three-phase brushless motor M can be stopped if one phase open relay is contact welded from among the three phases but the other two phase open relays are normally cut off. Hence, the abnormality is determined in a case where the two phase open relays from among three phase open relays are contact welded. It should be noted that the contact weld is a kind of a short-circuit failure and the contacts are mutually welded and stuck so that the contacts are not made open (even if the power supply to the corresponding electromagnetic section is turned off).

Figure 5A:
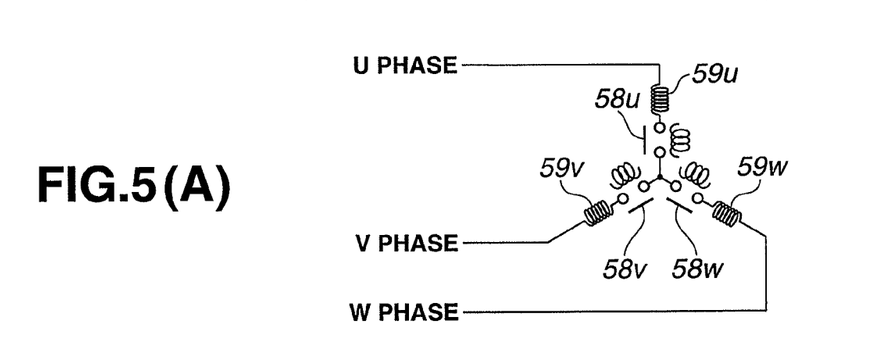
FIGS. 5(A), 5(B), 5(C), and 5(D) are rough views representing the power steering system for explaining an operation of diagnoses three times in a second comparative example in a case where the phase open relays are disposed in respective three phases of the motor.
Figure 5B:
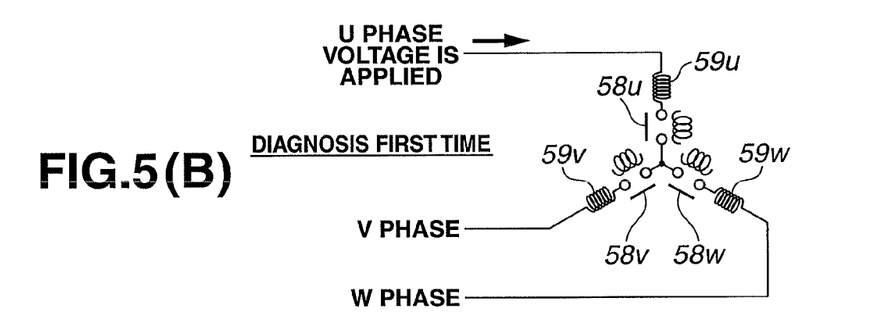
Figure 5C:
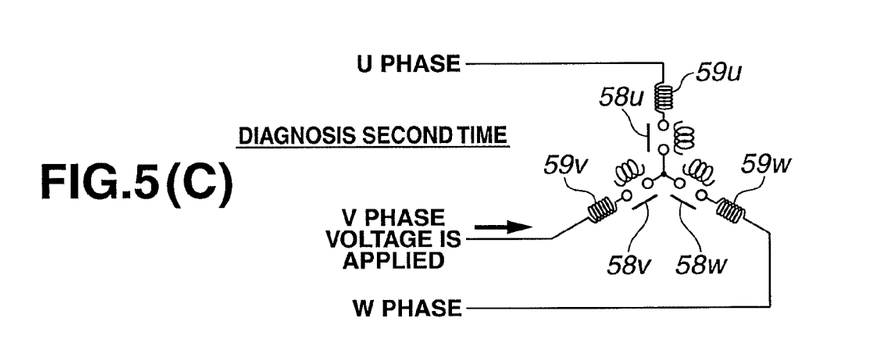
Figure 5D:
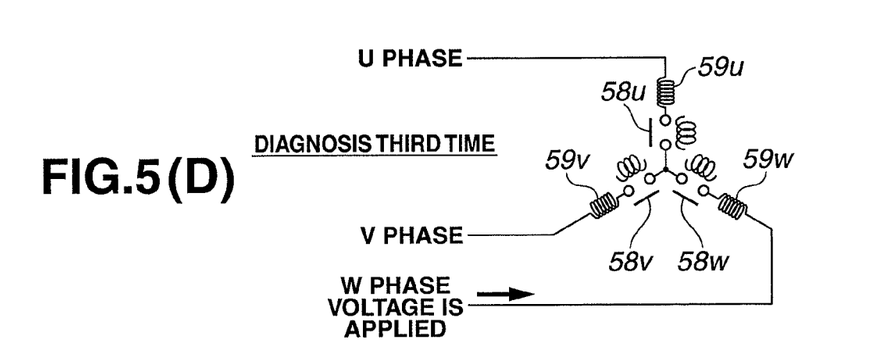

In the abnormality determination of the phase open relays, with all of phase open relays 58u, 58v, 58w in the open states, the power supplies to all of U phase, V phase, W phase are disabled. Then, at the first diagnosis, as shown in FIG. 5(B), the voltage is applied from U phase to detect the potential difference between U phase and V phase. If the potential difference between U phase and V phase is present, either of phase open relays 58u or 58v is normally turned off and if no potential difference is present, the voltage is applied from V phase to detect the potential difference between V phase and W phase. If no potential difference is present between V phase and W phase, both of phase open relays 58v, 58w are determined to the contact welded. At the third diagnosis, as shown in FIG. 5(D), the voltage is applied from W phase and the potential difference between W phase and U phase is detected. Then, if the potential difference is present between W phase and U phase, either of phase open relays 58w, 58u is determined to be normally cut off and if no potential difference between W phase and U phase is present, both of phase open relays 58w, 58u are determined to be contact welded.

As described above, in a case where the circuit exclusively used for the contact weld detection purpose is not used, the diagnoses need to be carried out by the number of the phase open relays or the number of contacts as in the case of first and second comparative example. Hence, the diagnosis program becomes complicated.

To avoid the complication of the diagnoses of the program, in the first embodiment, a method of detecting the contact weld(s) of any one or each of the phase open relays in a one-time diagnosis has been proposed.

Figure 3A:
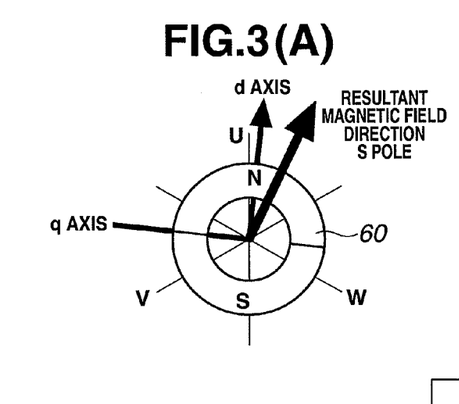
FIGS. 3(A), 3(B), 3(C), 3(D), 3(E), and 3(F) are rough configuration views representing a motor in the first embodiment for explaining a flow of current in a three phase stator of the motor.
Figure 3B:
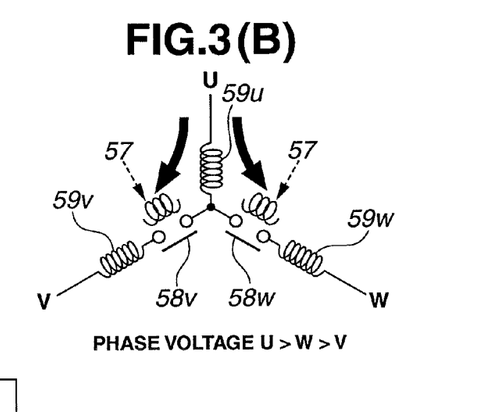

The abnormality determination method for phase open relays in the first embodiment will be explained on a basis of FIGS. 3(A), 3(B), 3(C), 3(D), 3(E), 3(F), and 3(F). In the first embodiment, phase open relays 58v, 58w are provided serially in motor windings 59v, 59w of V phase and W phase, as shown in FIGS. 3(A) and 3(B). In addition, N pole side of a rotor 60 constituted by a permanent magnet is positioned at U phase side.

Then, both of phase open relays 58v, 58w are turned off and vector control command signals Vd*, Vq* are generated to apply a d-axis current (a parallel direction to a magnetic flux on the permanent magnet) in a positive side is direction to perform a determination of the contact weld in either or both of phase open relays 58v, 58w.

When the d-axis current in the positive side direction is applied toward motor M as shown in FIGS. 3(A) and 3(B), a current is caused to try to flow from U phase to V phase and W phase. If phase open relays 58v, 58w are normally turned off, the current is not caused to flow in motor windings 59u, 59v, 59w and rotor 60 does not rotate.

Figure 3C:
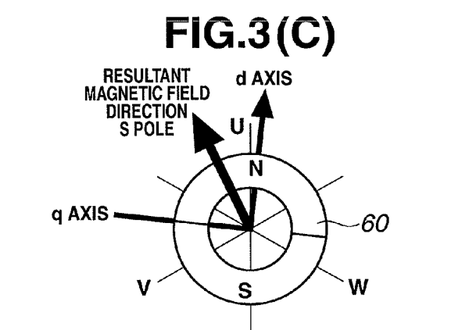

On the other hand, in a case where one 58w of phase open relays 58v, 58w of W phase is contact welded, when the d-axis current in the positive side direction is caused to flow, the current is not caused to flow from U phase to V phase but the current is caused to flow from U phase to W phase. Then, if the current is caused to flow to motor windings 59u, 59w of U phase and W phase. Then, as shown in FIG. 3(C), with a magnetic field in a + direction in U phase and the magnetic field in a − direction in W phase, a resultant magnetic field S pole is generated.

Figure 3D:
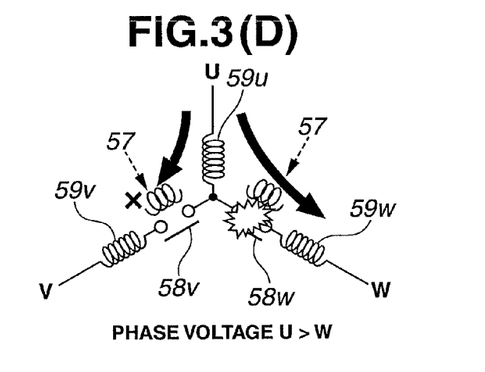
Figure 3E:
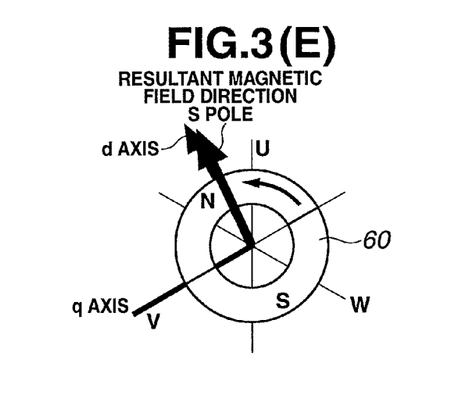

Rotor 60 is rotated in a direction at which N pole is overlapped on S pole of this resultant magnetic field and, as shown in FIG. 3(E), rotor 60 statically determinates at a position at which N pole of rotor 60 is overlapped on S pole of the resultant magnetic field. In this way, a current is caused to flow from a certain phase to another certain phase, rotor 60 is rotated and is balanced at a position at which S pole of the resultant magnetic field is overlapped on N pole of rotor 60. In addition, at this time, current detection circuit 55 detects the current and abnormality monitor section 57 detects the abnormality such that phase open relay 58v is contact welded. In addition, in a case where phase open relay 58v of V phase is contact welded, the d-axis current in the positive side direction is caused to flow in motor winding 59v so that a current is caused to flow from U phase to W phase in the same way as described above and the abnormality is detected as the contact welded. Therefore, it is possible to determine the contact welds of all of phase open relays at the one time diagnosis.

Figure 6A:
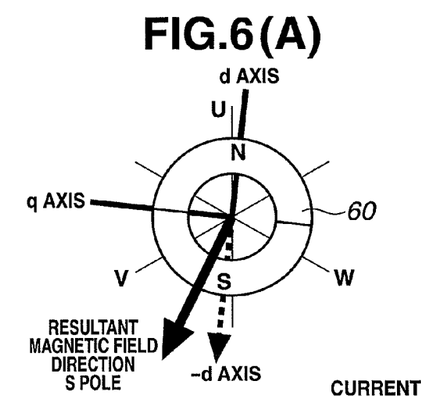
FIGS. 6(A), 6(B), 6(C), 6(D), 6(E), and 6(F) are rough configuration views of the motor in an alternative of the first embodiment according to the present invention in a case where a d-axis current is applied in a negative side direction to a motor shown in FIGS. 1 and 2.
Figure 6B:
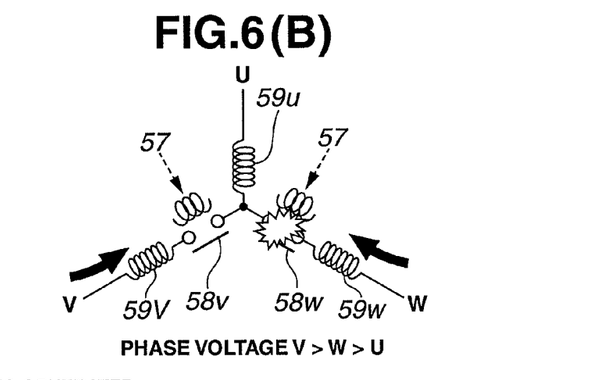
Figure 6C:
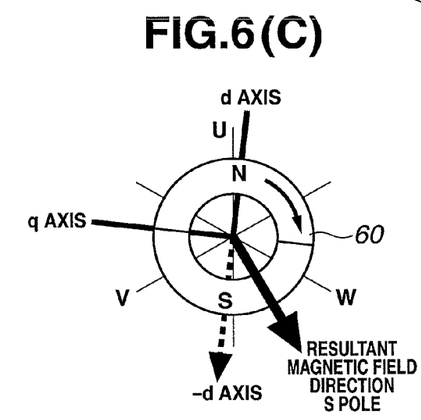
Figure 6D:
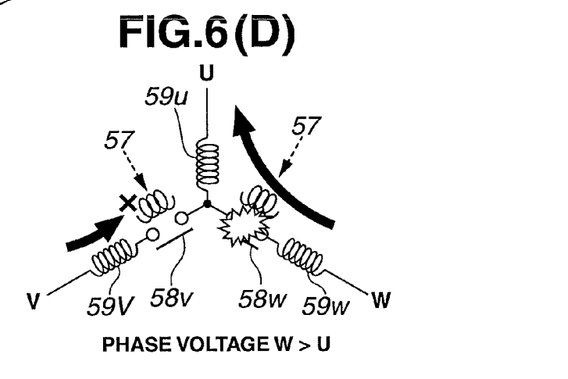
Figure 6E:
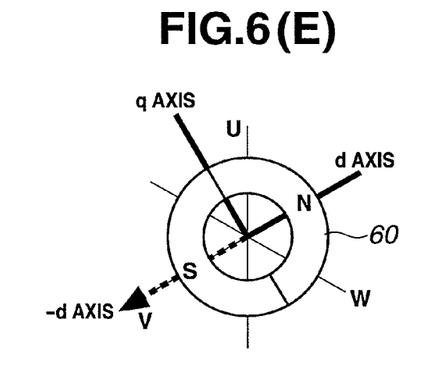
Figure 6F:
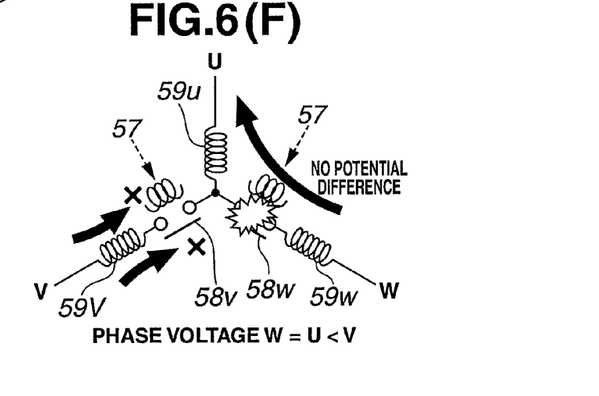

In addition, a method of causing the d-axis current to flow in a negative side direction is applicable. However, when the d-axis current in the positive side direction is caused to flow, the following effect can be exhibited, as compared with the method of causing the d-axis current in the negative direction. For example, as shown in FIGS. 6(A), 6(B), in a case where the d-axis is positioned at the U phase side, phase open relay 58v of V phase is normally turned off, and phase open relay 58w of W phase is contact welded, when the d-axis current in the negative side direction is caused to flow, the current from the V phase to the U phase is interrupted (turned off) by means of phase open relay 58v but the current from W phase to U phase is caused to flow so that a direction of the resultant magnetic field S pole is caused to be changed so that rotor 60 is rotated. Rotor 60 statically determinates at a position at which the electrical potential between U phase and W phase in which a failed location is interposed is zero (an intermediate position between U phase and W phase) and the current is not generated so that the abnormality of phase open relay 58w cannot be detected by the current detection. Therefore, in a case where the d-axis current in the negative side direction is caused to flow in motor windings 59u, 59v, 59w, it is necessary to carry out the abnormality detection by detecting the rotation of rotor 60, in place of the abnormality detection by the current detection.

Whereas, in a case where the d-axis current in the positive side direction is caused to flow in motor windings 59u, 59v, 59w, when any one of the phase open relays which is contact welded, the current is always caused to flow through the contact welded phase open relay. Hence, a more accurate detection of the contact welded phase open relay can be made through the abnormality detection using the current detection.

In addition, the q-axis orthogonal to the d-axis is a component contributing on the torque. Hence, the torque is generated on rotor 60 when the q-axis current is caused to flow in motor windings 59v, 59w, 59u, a torque is generated on rotor 60. However, even when the d-axis current is applied, the d-axis current is a component contributing on a magnetic flux of the magnet of rotor 60 and no torque is generated on rotor 60. That is to say, during the contact weld diagnosis, if steering wheel SW is rotated along with the rotation of rotor 60 of three-phase brushless motor M so that the vehicle driver gives un pleasant (unmatched) feeling. Hence, steering wheel SW is desirably not rotated if at all possible. In the first embodiment, the d-axis current is caused to flow in stead of the q-axis current which is a torque contributing component. Steering wheel SW is not rotated during the normal state (a case where phase open relays 58v, 58w are not contact welded). Only in a case of the abnormality (namely, either one of phase open relays 58v, 58w is contact welded), the motor windings receives the current flow and rotor 60 is rotated until the static determination) so that steering wheel SW is rotated. Consequently, the driver's unpleasant feeling due to the abnormality determination of the phase open relays can be suppressed to a minimum. In addition, a slight rotation of steering wheel SW at the time of the abnormality determination permits an information to the vehicle driver (as an alarm) that the abnormality occurs.

In addition, since current detection circuit 55 often detects a minute current due to an electronic element operation, an assembly error, or so forth even when the phase open relays are not contact welded. Hence, when a current value detected by current detection circuit 55 is equal to or higher than a predetermined value, the determination that at least one or more of the phase open relays is contact welded is made so that it becomes possible to improve a detection accuracy of the phase open relays.

If the power is supplied to motor windings 59u, 59v, 59w at a time of an abnormality in the current command issued from ECU 5 and at an abnormality state of the electromagnetic brake or so forth, some inconveniences occur in the power steering system. Therefore, it is necessary to always phase open relays 58v, 58w to be in the turned off state (interrupted state) when the above-described abnormality occurs. Therefore, abnormality monitor section 57 carries out the abnormality determination of whether one or two of phase open relays 58v, 58w are contact welded when an accessory switch (ACC SW) of the vehicle is switched to an on state and the electric power is supplied to the power steering system to prevent phase open relays 58v, 58w from not being in the turned off (interruption) state at the time of the abnormality described above. In this way, the improvement in a safety can be possible by carrying out the abnormality determination of the phase open relays before the travel of the vehicle.

In addition, abnormality monitor section 57 may carry out the abnormality determination of the phase open relays within a predetermined time after an ignition switch (IGN SW) is turned off. In this case, it is necessary to provide a self-holding function to which the electric power is supplied to the power steering system for the predetermined time even after the ignition switch (IGN SW) is turned off. Then, in a case where the abnormality of one or two of the phase open relays in the abnormality determination after the ignition switch is turned off, the abnormality of the phase open relays is informed to the vehicle driver when the ignition switch is again turned on. In this way, if the abnormality determination is made after the travel of the vehicle and the abnormality of the phase open relay is informed to the vehicle driver, the improvement in the safety can be achieved.

In addition, in a case where the abnormality in the phase open relays is detected in abnormality monitor section 57, the driving control of three-phase brushless motor M is stopped. In this way, in a case where the abnormality in the contact weld in at least any one of the phase open relays occurs, the steering assistance is stopped so that an abnormality operation such as a self-steer can be prevented.

[Second Embodiment]

The power steering apparatus in a second preferred embodiment will be described below. In the first embodiment, the current caused to flow in three-phase brushless motor M is detected to determine whether the contact welding of any one or more of the phase open relays is present. In the second embodiment, the determination of whether any one or more of the phase open relays is contact welded by detecting a voltage at a neutral point of tree-phase brushless motor M. The other structures are the same as the first embodiment and its explanation has been omitted.

Figure 7:
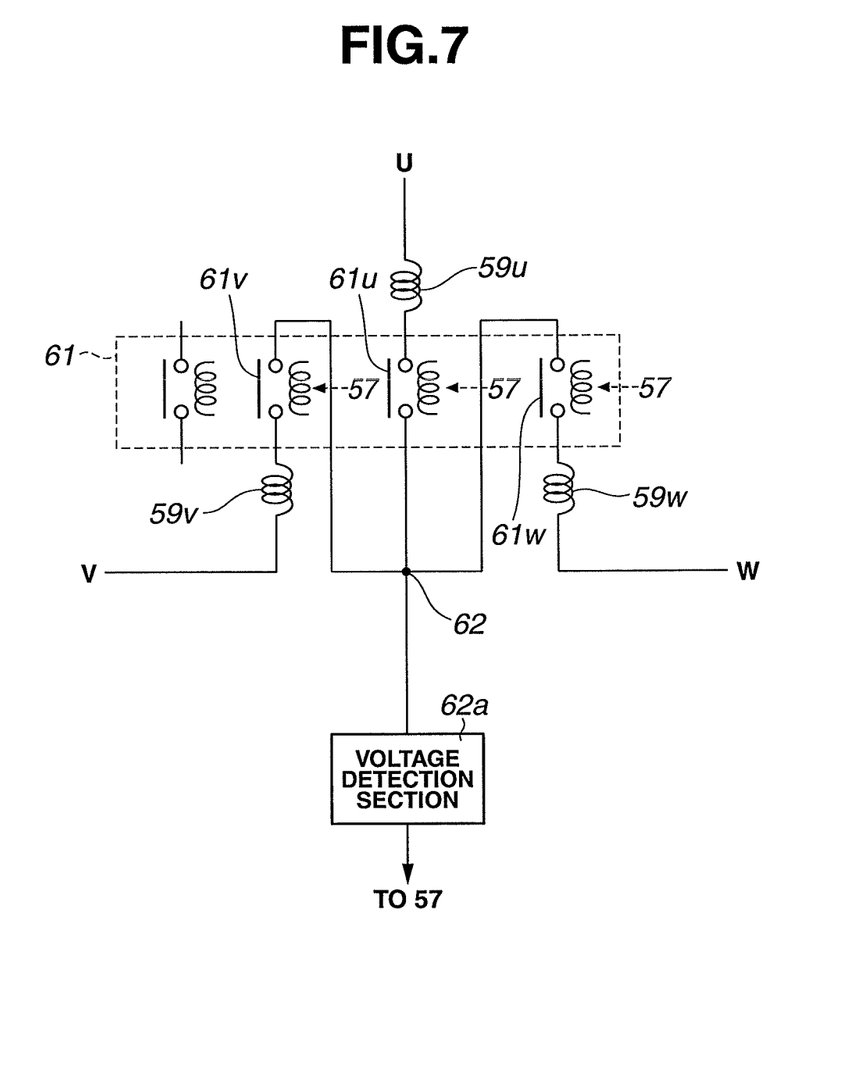
FIG. 7 is a rough view representing the motor in which three contact phase open relays are mounted in the motor in a second preferred embodiment according to the present invention.

In the second embodiment, as shown in FIG. 7, a star connection of U phase, V phase, and W phase of three-phase brushless motor M is carried out so that a three contact relay 61 to switch all of three phases of U phase, V phase, and W phase between a conduction state (closure state) in which all of the three phases can receive the power supply and a turned off state (open state or interruption state) in which the power supply for all of the three phases is not possible (disabled). As described hereinabove, in a case where the phase open relay (or contact) is installed for all of the three phases, three-phase brushless motor M can be stopped even if the contact weld of any one of the three phase open relays occurs. Therefore, in the second embodiment, the determination of the contact weld is made in a case where the contact weld of two phases or more of three phase open relays occurs.

First, with contacts of phase open relays 61u, 61v, 61w for all of U phase, V phase, and W phase opened, the d-axis current is tried to be caused to flow in the positive-side direction. Thus, in a case where two or more of three phase contacts are welded, a current is caused to flow in the motor windings between the corresponding two phases. For example, in a case where contacts of U phase and V phase are welded, the current is caused to flow from U phase, U phase motor winding 59u, neutral point 62, and motor winding 59v of V phase and the voltage at neutral point 62 is increased. The same is applied to the contact welds of phase open relays 61u, 61w of U phase and W phase or phase open relays 61v, 61w of V phase and W phase and the neutral point voltage is accordingly increased. Therefore, a voltage detection section 62a is installed in abnormality detection section 57 to detect the voltage at neutral point 62 so that the determination of whether two phase contacts or more contacts from three phase open relays 61 are welded can be made.

As described hereinabove, the detailed description of the above-described specific examples has been made but various modifications and corrections can be made without departing from the scope of the appended claims.

For example, in the first embodiment, only the specific structure in command signal calculation section 51 has been described. However, it is applicable to the other structures if the command values of the d-axis and q-axis can be calculated.

As described above, the same action and effect of the second embodiment can be achieved in the same way as the first embodiment.

Figure 3F:
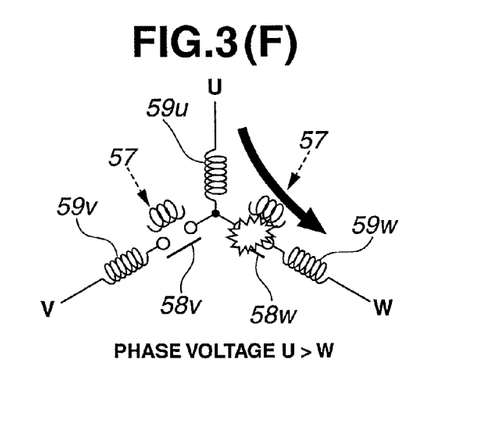

It should be noted that, as the explanation of FIGS. 3(A) and 3(B), when the d-axis voltage is applied toward motor M under a condition of phase voltages of U>W>V, some current is caused to try to flow from U phase to W phase and V phase, as the explanation of FIGS. 3(C) and 3(D), when the d-axis voltage is applied under the condition of phase voltage of U>W, the current does not flow from U phase to V phase but flows only to W phase due to the contact weld of 58w and, thus, the resultant magnetic field is varied, and as the explanation of FIGS. 3(E) and 3(F), the rotor is rotated in the resultant magnetic field and, thereafter, statically determinates. The current flowing from U phase to W phase is detected as the d-axis current.

Technical ideas graspable from the respective embodiments and except those described in the claims 1, 2, and 3 will be described below.

(1) The power steering system as claimed in claim 1, wherein the abnormality monitor section determines the abnormality in at least one of the phase open relays when the current detection circuit detects that the current having a value equal to or larger than a predetermined value is caused to flow through the current detection circuit.

(1) According to the technical idea described in item (1), since a minute current is often detected due to electronic element operational error, assembly error, or so forth even if no abnormality is found in the phase open relays, when the detected current is equal to or larger than the predetermined value (ordinarily, an inter-phase current value when the contact weld of at least one of the phase open relays occurs), the abnormality is determined to occur in at least one of the phase open relays so that a detection accuracy can be improved.

(2) The power steering system as claimed in claim 1, wherein the abnormality monitor section carries out the abnormality determination of the phase open relays when an accessory switch of the vehicle is turned on and an electric power is supplied to the power steering system.

(2) According to the technical idea described in item (2), the determination of the abnormality in the phase open relays is carried out before the travel of the vehicle so that a safety of the vehicle can be increased.

(3) The power steering system as claimed in claim 1, wherein the control apparatus has a self-holding function by which an electric power is supplied to the control apparatus for a predetermined duration of time even after an ignition switch is turned off and the abnormality monitor section carries out the abnormality determination of the phase open relays with the predetermined duration of time after the ignition switch is turned off.

(3) According to the technical idea described in item (3), the determination of the abnormality in the phase open relays is carried out after the travel of the vehicle so that the safety of the vehicle can be increased.

(4) The power steering system as set forth in item (3), wherein the abnormality monitor section informs a vehicular occupant of the abnormality in the phase open relays when the ignition switch is again turned on in a case where the abnormality of at least one of the phase open relays is detected in the abnormality determination within the predetermined duration of time.

(4) The power steering system as set forth in item (3), wherein the abnormality monitor section informs a vehicular occupant of the abnormality in the phase open relays when the ignition switch is again turned on in a case where the abnormality of at least one of the phase open relays is detected in the abnormality determination within the predetermined duration of time.

(4) According to the technical idea described in item (4), the abnormality in the phase open relays is informed to the vehicular occupant (including the vehicle driver) so that the safety can be increased.

(5) The power steering system as claimed in claim 1, wherein the control apparatus stops a driving control of the motor by the control apparatus, in a case where the abnormality monitor section detects the abnormality of at least one of the phase open relays.

(5) According to the technical idea described in item (5), the steering assistance is stopped in a case where the abnormality in the phase open relays is detected. Thus, an abnormal operation such as a self steer or so forth can be prevented.

(6) The power steering system as claimed in claim 2, wherein the abnormality monitor section carries out the abnormality determination of at least one of the phase open relays when an accessory switch of the vehicle is turned on and an electric power is supplied to the power steering system.

(6) According to the technical idea describe in item (6), the determination of the abnormality in the phase open relays is carried out before the travel of the vehicle so that the safety of the vehicle can be increased.

(7) The power steering system as claimed in claim 2, wherein the control apparatus has a self-holding function by which an electric power is supplied to the control apparatus for a predetermined duration of time even after an ignition switch is turned off and the abnormality monitor section carries out the abnormality determination of the phase open relays with the predetermined duration of time after the ignition switch is turned off.

(7) According to the technical idea described in item (7), the determination of the abnormality in the phase open relays is carried out after the travel of the vehicle so that the safety of the vehicle can be increased.

(8) The power steering system as set forth in item (7), wherein the abnormality monitor section informs a vehicular occupant of the abnormality of the phase open relays when the ignition switch is again turned on in a case where the abnormality of the phase open relays in the abnormality determination within the predetermined duration of time.

(8) According to the technical idea described in item (8), the abnormality in the phase open relays is informed to the vehicular occupant (including the vehicle driver) so that the safety can be increased.

(9) The power steering system as claimed in claim 2, wherein the control apparatus stops a driving control of the motor in a case where the abnormality monitor section detects the abnormality of at least one of the phase open relays.

(9) According to the technical idea described in item (9), the steering assistance is stopped in a case where the abnormality in the phase open relays is detected. Thus, the abnormal operation such as the self steer or so forth can be prevented.

(10) The power steering system as claimed in claim 3, wherein the abnormality monitor section determines the abnormality of at least two of the phase open relays when the detected value detected by the voltage detection circuit is equal to or higher than a predetermined value.

(10) According to the technical idea described in item (10), since a minute voltage is often detected due to electronic element operational error, assembly error, or so forth even if no abnormality is found in the phase open relays, when the detected voltage is equal to or higher than the predetermined value (ordinarily, the neutral point voltage when the contact welds of at least two of the phase open relays occur), the abnormality is determined to occur in at least two of the phase open relays so that the detection accuracy can be improved.

(11) The power steering system as claimed in claim 3, wherein the abnormality monitor section carries out the abnormality determination of at least two of the phase open relays when an accessory switch of the vehicle is turned on and an electric power is supplied to the power steering system.

(11) According to the technical idea describe in item (6), the determination of the abnormality in the phase open relays is carried out before the travel of the vehicle so that the safety of the vehicle can be increased.

(12) The power steering system as claimed in claim 3, wherein the control apparatus has a self-holding function by which an electric power is supplied to the control apparatus for a predetermined duration of time even after an ignition switch is turned off and the abnormality monitor section carries out the abnormality determination of at least two of the phase open relays during the predetermined duration of time after the ignition switch is turned off.

(12) According to the technical idea described in item (12), the determination of the abnormality in the phase open relays is carried out after the travel of the vehicle so that the safety of the vehicle can be increased.

(13) The power steering system as set forth in item (12), wherein the abnormality monitor section informs a vehicular occupant of the abnormality of at least two of the phase open relays when the ignition switch is again turned on in a case where the abnormality of at least two of the phase open relays in the abnormality determination within the predetermined duration of time.

(13) According to the technical idea described in item (13), the abnormality in the phase open relays is informed to the vehicular occupant (including the vehicle driver) so that the safety can be increased.

(14) The power steering system as claimed in claim 3, wherein the control apparatus stops a driving control of the motor in a case where the abnormality monitor section detects the abnormality of at least two of the phase open relays.

(14) According to the technical idea described in item (14), the steering assistance is stopped in a case where the abnormality in the phase open relays is detected. Thus, the abnormal operation such as the self steer or so forth can be prevented.

This application is based on a prior Japanese Patent Application No. 2012-201120 filed in Japan on Sep. 13, 2012. The entire contents of this Japanese Patent Application No. 2012-201120 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A power steering system, comprising:
   a steering mechanism that steers steerable wheels of a vehicle along with a steering operation of a steering wheel;
   a motor that provides a steering assistance force for the steering mechanism;
   a control apparatus that drivingly controls the motor;
   a command signal calculation section disposed in the control apparatus to calculate vector control command signals to drivingly control the motor in accordance with a driving situation of the vehicle;
   a two-phase to three-phase conversion section disposed in the control apparatus to convert the vector control command signals into three phase command signals which are command signals for respective phases of the motor;
   a Pulse Width Modulation (PWM) control section disposed in the control apparatus to output a PWM duty signal for each phase of U phase, V phase, and W phase in accordance with the three phase command signals;
   an inverter disposed in the control apparatus and constituted by a switching circuit drivingly controlled by the PWM duty signal for each phase of the motor;
   a current detection circuit configured to detect three phase currents flowing into the inverter;
   a plurality of phase open relays switchable at least any two of the three phases of the motor between a conduction state in which a power supply is enabled to be supplied to the at least any two of the three phases of the motor and an interruption state in which the power supply is disabled to be supplied to the at least any two of the three phases; and
   an abnormality monitor section configured to output the vector control command signals to supply only a d-axis current in a positive side direction toward the motor, with all of the phase open relays in the interruption state, and to determine an abnormality in at least one of the phase open relays in a case where a current value is detected by the current detection circuit.

2. The power steering system as claimed in claim 1, wherein the abnormality monitor section determines the abnormality in at least one of the phase open relays when the current detection circuit detects that the current having a value equal to or larger than a predetermined value is caused to flow through the current detection circuit.

3. The power steering system as claimed in claim 1, wherein the abnormality monitor section carries out the abnormality determination in the at least one of the phase open relays when an accessory switch of the vehicle is turned on and the power is supplied to the power steering system.

4. The power steering system as claimed in claim 1, wherein the control apparatus has a self-holding function by which the power is supplied to the control apparatus for a predetermined duration of time even after an ignition switch is turned off and the abnormality monitor section carries out the abnormality determination in the at least one of the phase open relays with the predetermined duration of time after the ignition switch is turned off.

5. The power steering system as claimed in claim 4, wherein the abnormality monitor section informs a vehicular occupant of the abnormality in at least one of the phase open relays when the ignition switch is again turned on in a case where the abnormality in at least one of the phase open relays is detected in the abnormality determination within the predetermined duration of time.

6. The power steering system as claimed in claim 1, wherein the control apparatus stops a driving control of the motor by the control apparatus, in a case where the abnormality monitor section detects the abnormality in the at least one of the phase open relays.

7. A power steering system, comprising:
a steering mechanism that steers steerable wheels of a vehicle along with a steering operation of a steering wheel;
a motor that provides a steering assistance force for the steering mechanism;
a control apparatus that drivingly controls the motor;
a command signal calculation section disposed in the control apparatus to calculate vector control command signals to drivingly control the motor in accordance with a driving situation of the vehicle;
a two-phase to three-phase conversion section disposed in the control apparatus to convert the vector control command signals into three phase command signals which are command signals for respective phases of the motor;
a PWM control section disposed in the control apparatus to output a PWM duty signal for each phase of U phase, V phase, and W phase in accordance with the three phase command signals;
an inverter disposed in the control apparatus and constituted by a switching circuit drivingly controlled by the PWM duty signal for each phase of the motor;
a current detection circuit configured to detect three phase currents flowing into the inverter;
a plurality of phase open relays switchable at least any two of the three phases of the motor between a conduction state in which a power supply is enabled to be supplied to the at least any two of the three phases of the motor and an interruption state in which the power supply is disabled to be supplied to the at least any two of the three phases; and
an abnormality monitor section configured to output the vector control command signals to supply only a d-axis current in a single direction toward the motor, with all of the phase open relays in the interruption state, and to determine an abnormality in at least one of the phase open relays in a case where a rotation of the motor is detected.

8. The power steering system as claimed in claim 7, wherein the abnormality monitor section carries out the abnormality determination in the at least one of the phase open relays when an accessory switch of the vehicle is turned on and the power is supplied to the power steering system.

9. The power steering system as claimed in claim 7, wherein the control apparatus has a self-holding function by which the power is supplied to the control apparatus for a predetermined duration of time even after an ignition switch is turned off and the abnormality monitor section carries out the abnormality determination in the at least one of the phase open relays with the predetermined duration of time after the ignition switch is turned off.

10. The power steering system as claimed in claim 9, wherein the abnormality monitor section informs a vehicular occupant of the abnormality in the at least one of the phase open relays when the ignition switch is again turned on in a case where the abnormality in the at least one of the phase open relays in the abnormality determination within the predetermined duration of time.

11. The power steering system as claimed in claim 7, wherein the control apparatus stops a driving control of the motor in a case where the abnormality monitor section detects the abnormality in the at least one of the phase open relays.

12. The power steering system as claimed in claim 11, wherein the abnormality monitor section informs a vehicular occupant of the abnormality in the at least two of the phase open relays when the ignition switch is again turned on in a case where the the at least two of the phase open relays in the abnormality determination within the predetermined duration of time.

13. The power steering system as claimed in claim 7, wherein the single direction toward the motor is a negative side direction toward the motor.

14. A power steering system, comprising:
a steering mechanism that steers steerable wheels of a vehicle along with a steering operation of a steering wheel;
a motor including motor windings connected in a star connection and that provides a steering assistance force for the steering mechanism;
a control apparatus that drivingly controls the motor;
a command signal calculation section disposed in the control apparatus to calculate vector control command signals to drivingly control the motor in accordance with a driving situation of the vehicle;
a two-phase to three-phase conversion section disposed in the control apparatus to convert the vector control command signals into three phase command signals which are command signals for respective phases of the motor;
a PWM control section disposed in the control apparatus to output a PWM duty signal for each phase of U phase, V phase, and W phase in accordance with the three phase command signals;
an inverter disposed in the control apparatus and constituted by a switching circuit drivingly controlled by the PWM duty signal for each phase of the motor;
a voltage detection circuit that detects a voltage at a neutral point of the star connection of the motor;
a plurality of phase open relays switchable all of the three phases of the motor between a conduction state in which a power supply is enabled to be supplied to a corresponding one phase of the three phases of the motor and an interruption state in which the power supply is disabled to be supplied to the corresponding one phase; and
an abnormality monitor section configured to output the vector control command signals to supply only a d-axis current in a single direction toward the motor, with all of the phase open relays in the interruption state, and to determine an abnormality in at least two of the phase open relays in a case where the voltage detection circuit detects a potential difference.

15. The power steering system as claimed in claim 14, wherein the abnormality monitor section determines the in the at least two of the phase open relays when the detected value detected by the voltage detection circuit is equal to or higher than a predetermined value.

16. The power steering system as claimed in claim 14, wherein the abnormality monitor section carries out the abnormality determination in the at least two of the phase open relays when an accessory switch of the vehicle is turned on and the power is supplied to the power steering system.

17. The power steering system as claimed in claim 14, wherein the control apparatus has a self-holding function by which the power is supplied to the control apparatus for a predetermined duration of time even after an ignition switch is turned off and the abnormality monitor section carries out the abnormality determination in the at least two of the phase open relays during the predetermined duration of time after the ignition switch is turned off.

18. The power steering system as claimed in claim 14, wherein the control apparatus stops a driving control of the motor in a case where the abnormality monitor section detects the abnormality in the at least two of the phase open relays.

19. The power steering system as claimed in claim 14, wherein the single direction toward the motor is a negative side direction toward the motor.

* * * * *